United States Patent [19]
Lichtenfield et al.

[11] Patent Number: 6,067,192
[45] Date of Patent: May 23, 2000

[54] PORTABLE VIEWING APPARATUS HAVING MULTIPLE INTERCHARGEABLE OPTICAL MODULES

[76] Inventors: Louis Lichtenfield, 8360 Sunset View Dr., Los Angeles, Calif. 90069; Donald E. Trumbull, 20867 Exhibit Pl., Woodland Hills, Calif. 91367

[21] Appl. No.: 08/889,115

[22] Filed: Jul. 7, 1997

Related U.S. Application Data

[63] Continuation-in-part of application No. 08/579,982, Dec. 28, 1995, abandoned.

[51] Int. Cl.[7] ............................ G02B 27/02; G02B 25/00; G02B 27/22
[52] U.S. Cl. .......................... 359/480; 359/481; 359/482; 359/477; 359/407
[58] Field of Search ..................................... 359/477, 480, 359/481, 482, 483, 407

[56] References Cited

U.S. PATENT DOCUMENTS

| | | | |
|---|---|---|---|
| 2,625,855 | 1/1953 | Gaylor | 88/36 |
| 2,757,574 | 8/1956 | Thorburn | 88/39 |
| 2,935,910 | 5/1960 | Schmidt | 88/39 |
| 3,029,696 | 4/1962 | Schmidt | 88/41 |
| 3,454,324 | 7/1969 | Schmidt . | |
| 3,458,246 | 7/1969 | Krebs . | |
| 4,323,298 | 4/1982 | Brennan . | |
| 4,865,438 | 9/1989 | Wada . | |
| 5,124,840 | 6/1992 | Trumbull et al. | 359/480 |
| 5,307,204 | 4/1994 | Dor | 359/480 |
| 5,483,301 | 1/1996 | Clarke . | |

FOREIGN PATENT DOCUMENTS

| | | | |
|---|---|---|---|
| 93 03 663 U | 3/1993 | Germany | G02C 5/00 |
| 296 05 739 U1 | 7/1996 | Germany | G02B 23/18 |

*Primary Examiner*—Cassandra Spyrou
*Assistant Examiner*—Audrey Chang
*Attorney, Agent, or Firm*—Sheppard, Mullin, Richter & Hampton; James R. Brueggemann

[57] ABSTRACT

A portable viewing apparatus having a plurality of associated pairs of left and right optical modules, each pair of which can be selectively used to provide a user with a different viewing effect when viewing objects such as video monitors. Exemplary viewing effects include uniform two-dimensional magnification over a variety of ranges and disanamorphic magnification for wide-screen and three-dimensional viewing of special programming material. The selected pair of optical modules are removably attachable to mounting shoes, and separate control assemblies are configured to allow the user to manually adjust the interocular spacing and convergence/divergence of the selected optical modules.

22 Claims, 4 Drawing Sheets

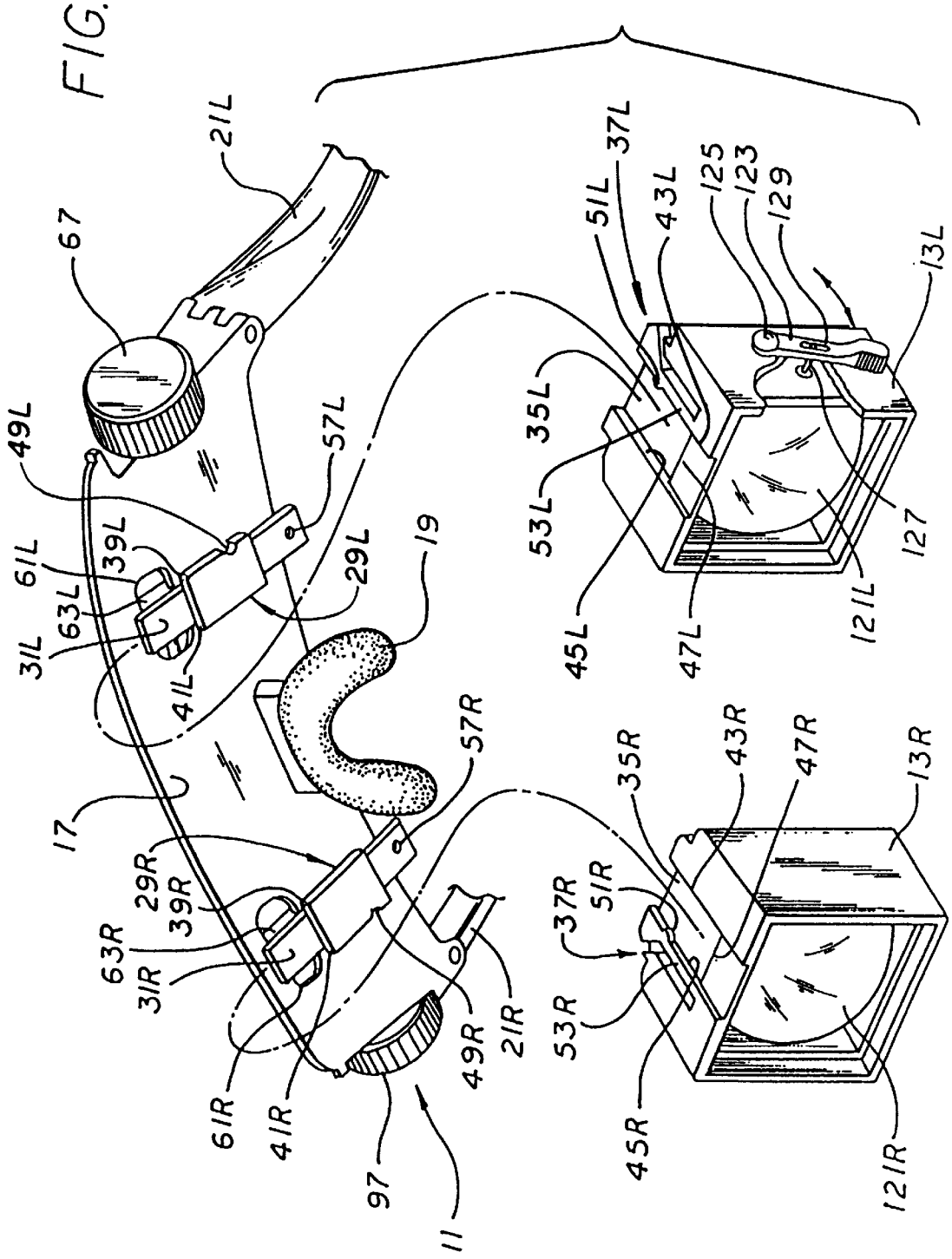

PORTABLE VIEWING APPARATUS HAVING MULTIPLE INTERCHARGEABLE OPTICAL MODULES

This is a continuation-in-part of application Ser. No. 08/579,982, filed Dec. 28, 1995, and now abandoned.

BACKGROUND OF THE INVENTION

This invention relates generally to portable viewing devices configured to be worn on a user's head and, more particularly, to viewing devices that permit the user to achieve a selected one of multiple desired viewing effects, including for example magnification over a relatively distant viewing range, magnification over a relatively close viewing range, and wide screen viewing.

Portable viewing devices are sometimes used to provide a magnified image for a user viewing a distant object, such as a television or video screen. Typically, however, the optical elements of such a device provide a focused image over only a limited range of viewing distances. Such devices thus are generally incapable of being conveniently adapted to provide magnification of both a video screen of a computer terminal, viewed at a close distance, and the screen of a large projection television, viewed across a large room. Moreover, such devices generally provide only a single level of magnification Portable anamorphic viewing devices are known for providing horizontal magnification only, to allow a user to view television broadcasts of horizontally compressed, wide-screen motion pictures with the proper image proportions restored. An example of such a device is disclosed in U.S. Pat. No. 5,124,840. Such devices also can be used to provide a viewer with a three-dimensional viewing effect based on a display of specialized, horizontally compressed two-dimensional images.

Portable viewing devices of the kind described briefly above generally have included a convergence control, to vary the angle of the optical paths of the image as observed by the user's left and right eyes. However, such convergence controls generally have operated by pivoting only a single lens assembly for one eye, or have required individual angular adjustment of the lens assemblies for both eyes. In cases where only one such lens assembly is angularly moved with respect to the other, the convergence of the assemblies only approximates the natural bilateral convergence of the user's eyes. In cases where both lens assemblies are adjusted individually, a user can have difficulty in adjusting the assemblies in equal but opposite directions to correspond to natural eye convergence. Moreover, individual adjustment of the lens assemblies to correct for convergence is considered time consuming and cumbersome to the user, and it can introduce objectionable distortion.

Known portable viewing devices thus have a major limitation of being configured to a single optical function, such as two-dimensional magnification or anamorphic magnification, but not both. Moreover, even in the case of two-dimensional magnification, known portable viewing devices are restricted to a limited single level of magnification and to a narrow range of viewing distances that can be accommodated by a focus adjustment. Prior devices have not allowed a user to select from varying levels of magnification or to adjust for wide variations in viewing distances, depending on particular circumstances. Moreover, known portable viewing devices have provided convergence correction through adjustment of a single lens assembly with respect to the other, thus only approximating normal eye convergence, or through individual adjustment of both lens assemblies, requiring the user to carry out such adjustment by trial and error.

Thus, a need exists for a portable device configured to be worn on a user's head that provides the user with a capability of selecting between different optical functions, e.g., two-dimensional magnification and disanamorphic magnification. Moreover, a need exists for such a device that permits the user to select different levels of magnification and that permits the viewer to utilize the device over a wide range of viewing distances, from close-up to infinity. Moreover, a need exists for such a device that allows the user to effect bilateral convergence correction without having to adjust the angle of each lens assembly individually. The present invention satisfies these needs.

SUMMARY OF THE INVENTION

The present invention is embodied in a portable viewing apparatus configured to be worn on a user's head comprising a frame, left and right receptacles secured to the frame such that they are located adjacent to the user's respective left and right eyes when the frame is being worn, and a plurality of associated pairs of optical modules, each such pair including left and right optical modules configured to be selectively received individually by the respective left and right receptacles. The left and right optical modules of each associated pair each include two or more lens elements that cooperate to provide a specific optical effect for the user.

The plurality of pairs of associated optical modules are configured to provide different optical effects for the user wearing the device. Examples of these optical effects include two-dimensional magnification over a relatively distant range, two-dimensional magnification over a relatively close range, and anamorphic magnification along a horizontal axis only. Other examples include two-dimensional magnification by differing amounts.

In one feature of the invention, the interocular spacing between the left and right receptacles, which receive the respective left and right optical modules, is adjustable, and convergence/divergence of the left and right receptacles is adjustable. This adjustment is advantageously achieved by moving the receptacles toward and away from each other along a linear axis, without rotation about a horizontal axis. This allows the optical modules to incorporate lenses having a desirable rectangular periphery, whereby a rectangular image can be provided for all possible adjusted positions.

Further, the position of at least one lens of each optical module is adjustable relative to the other lens(es) in the modules, to provide focusing for the user over a predetermined range. In addition, the vertical position of at least one of the lenses in either the left optical module or the right optical module of an associated pair of modules is adjustable, to allow the user to adjust the vertical alignment of the left and right images.

In a more detailed feature of the invention, each receptacle and mating optical module, together, include a rectangular shoe having substantially parallel side walls, and further include a slot having undercut, substantially parallel side edges sized to conformably and slidably receive the shoe. Each receptacle and mating optical module, together, further include a locking mechanism for releasably securing the optical module in place, such locking mechanism including an elongated, flexible leg that defines one of the slot's side edges, and further including a tab and mating recess defined in the flexible leg and shoe and configured to engage each other when the shoe is fully received in the slot.

In another more detailed feature of the invention, the focus adjustment mechanism and the locking mechanism of each optical module are located on the module's outward side. This allows the optical modules to be removed and replaced, and their focus conveniently adjusted, while the apparatus is being worn.

The apparatus is configured to be worn on a user's head, allowing the user to freely move about relative to a viewed object or screen. Moreover, the apparatus is generally unobtrusive to other persons who might be viewing the same object or screen, with or without the aid of a similar viewing apparatus. The apparatus is sophisticated, yet relatively simple in construction, and thus inexpensive to manufacture.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 1A shows a user wearing the portable viewing apparatus with a first pair of associated optical modules, viewing a video screen of a computer terminal at a relatively close distance. FIG. 1B shows a user wearing the portable viewing apparatus with a second pair of associated optical modules, viewing a television screen at a second, relatively far distance, the screen displaying side-by-side, horizontally compressed images provided by a special cassette recording, such that the user experiences a three-dimensional viewing effect.

FIG. 3 is a front perspective view of the portable viewing apparatus of FIG. 1A, showing the structure for attaching and removing a pair of left and right optical modules.

DESCRIPTION OF THE PREFERRED EMBODIMENT

Figure 1A:
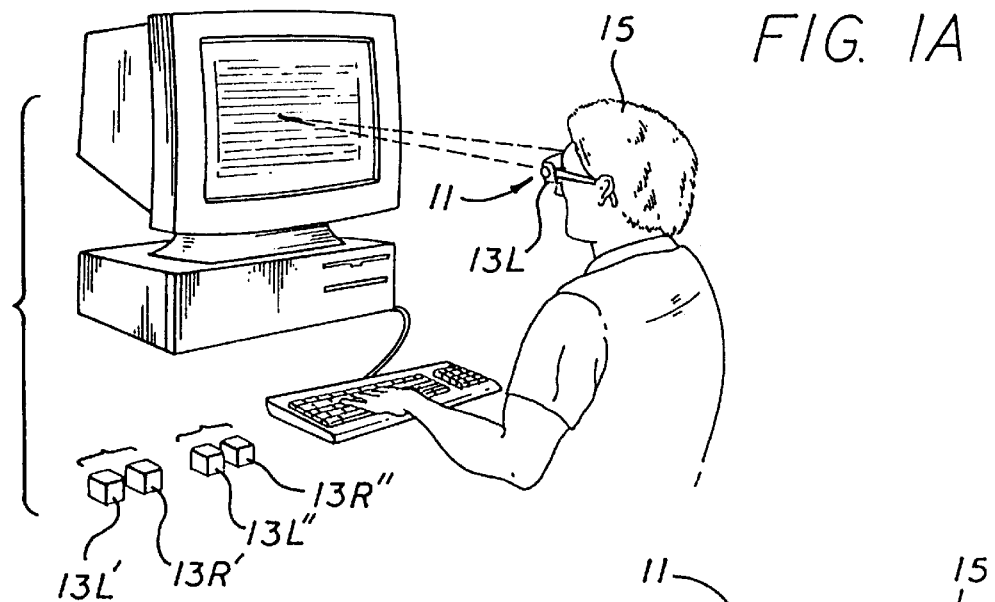
FIGS. 1A–1B are representations of a user using a portable viewing apparatus of the present invention, showing use of selected optical modules from a plurality of pairs of optical modules, selected for differing viewing circumstances.
Figure 1B:
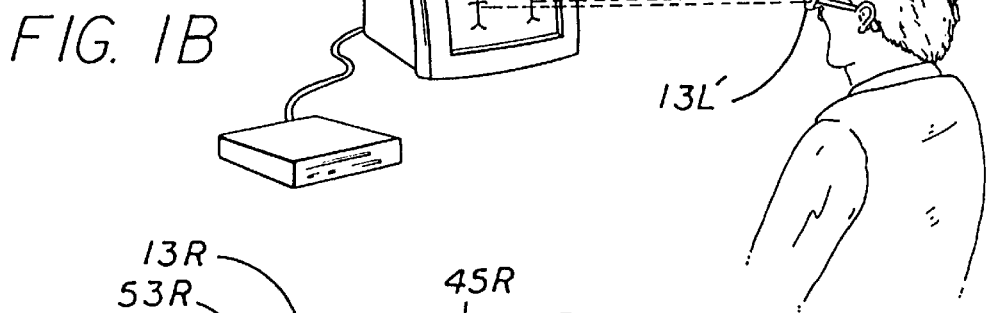
Figure 2:
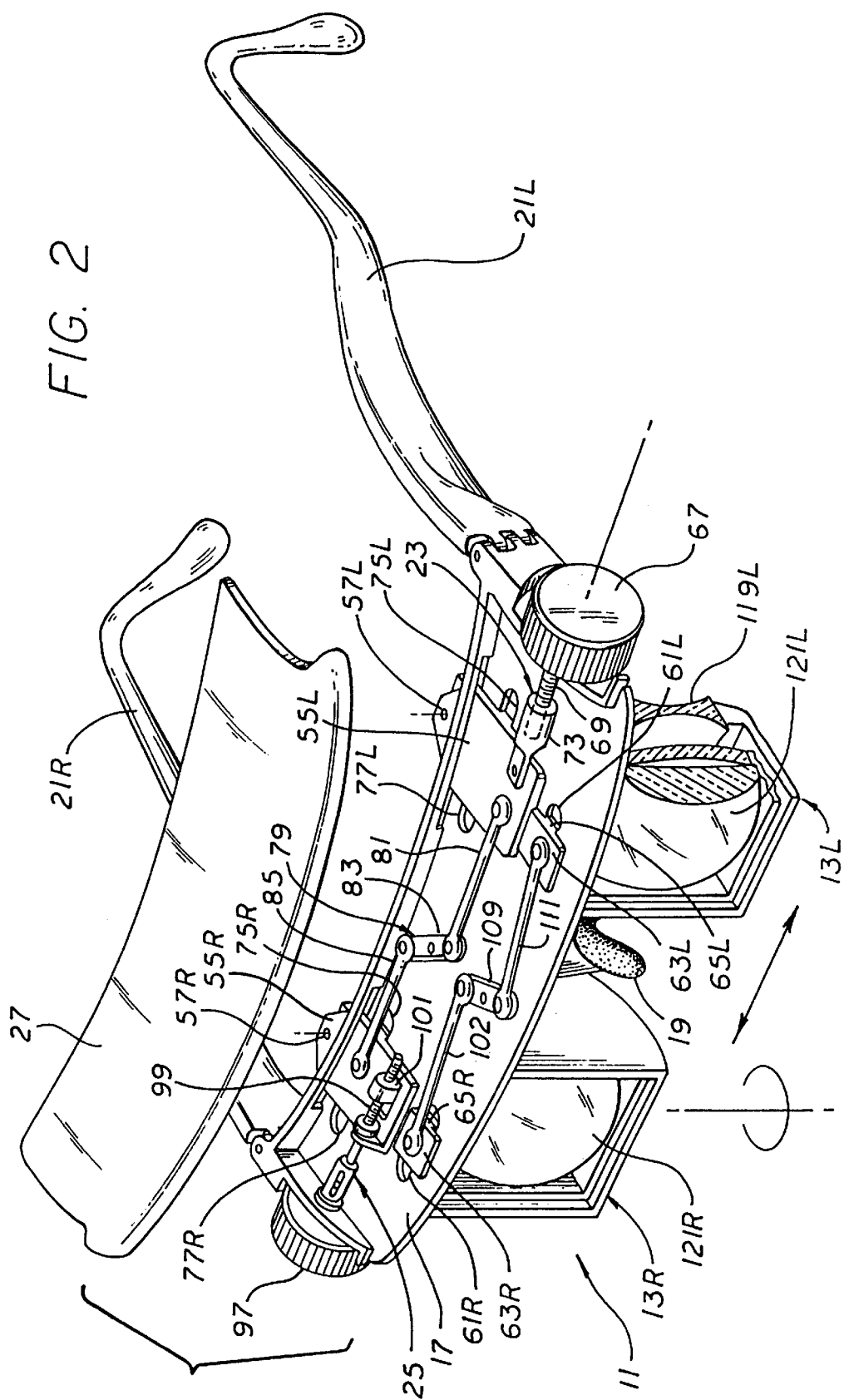
FIG. 2 is a partially exploded perspective view of the portable viewing apparatus of FIG. 1A.

Referring now to the drawings, and in particular to FIGS. 1A, 1B and 2, there is shown a preferred embodiment of a portable viewing apparatus 11 having an eyeglass-type frame that is configured to receive one of several associated pairs of optical modules 13L and 13R, 13L' and 13R', and 13L" and 13R, to provide a user 15 with a selected optical viewing effect. The apparatus includes a horizontal visor 17, a bridge 19 that supports the apparatus on the user's nose, and pivotally secured left and right ear pieces 21L and 21R, respectively, that secure the apparatus on the user's head.

The optical modules 13L and 13R being worn by the user 15 in FIG. 1A provide two-dimensional magnification over a relatively close viewing range, ordinarily encountered when using a personal computer, e.g., up to about six feet. Other pairs of optical modules can provide two-dimensional magnification over an intermediate viewing range, e.g., six-to-25 feet, and over a relatively distant viewing range, e.g., 25 feet to infinity. Another pair of optical modules, for example the modules 19L' and 19R' depicted in FIG. 1B, include disanamorphic lenses for horizontally expanding a horizontally compressed image, for wide-screen and/or three-dimensional viewing. These optical effects are described in U.S. Pat. No. 5,124,840. Still other pairs of optical modules can provide different amounts of magnification, up to a maximum of about 2.5. These various modules can be of differing lengths, but all are configured to be selectively attached to the frame.

The apparatus 11 further includes an interocular spacing control assembly 23, for use in manually adjusting the spacing between the left an right optical modules 13L and 13R, and a convergence control assembly 25, for use in manually adjusting the convergence/divergence of the modules. Both assemblies are mounted on the visor 17, beneath a removable cover plate 27.

Referring now to FIG. 3, left and right mounting shoes 29L and 29R, respectively, are pivotably, and slidably, attached to the underside of the visor 17 in such a manner as to be adjacent and above the user's respective left and right eyes when the viewing apparatus 11 is worn. These mounting shoes are configured to releasably retain the separate pairs of optical modules 13L and 13R, 13L' and 13R', or 13L" and 13R". In particular, the mounting shoes 29L and 29R include elongated guide strips 31L and 31R and associated retention strips 33L and 33R, which are configured to conformably slide into retention slots 35L and 35R formed in the top sides of each pair of left and right optical modules. Locking mechanisms 37L and 37R releasably and precisely secure the modules in place.

More particularly, and with specific reference to FIG. 3, the left shoe 29L, the retention strip 33L and the guide strip 31L are formed as a single, integral unit, and the retention strip is slightly wider in width than the guide strip such that guide channels 39L and 41L are formed between the retention strip's side edges and the underside of the visor 17. The retention slot 35L formed in the top side of the left optical module 13L includes undercut side edges or lips 43L and 45L that are sized to receive and retain the guide channels of the retention strip 33L when the module is slid onto the shoe.

The retention slot 35L includes a stop ridge 47L that is positioned to abut against the leading edge of the retention strip 33L when the left optical module 13L is slidably engaged with the left mounting shoe 29L at a predetermined maximum engagement. The locking mechanism 37L includes a recess 49L on the retention strip 33L and a corresponding tab 51L on the left optical module. The tab 51L is situated on a flexible leg 53L that flexes laterally to accommodate insertion of the retention strip. When the retention strip has been slid fully into the retention slot 35L, the tab interlocks with the recess, to restrain further slidable movement. To remove the module 13L from the mounting shoe 29L, the user 15 manually pushes the flexible leg 53L laterally, to release the tab 51L from the recess 49L, whereupon the module can be slid forwardly from the shoe.

In a similar fashion, the right optical module 13R has a similar retention slot 35R on its top surface, with bilateral lips 43R and 45R and a stop ridge 47R. The retention strip 33R of the right mounting shoe 29R is slidably received by the retention slot 35R, where it is stopped by the stop ridge 47R at maximum engagement, and where it is held in place by the locking mechanism 37R. Thus, the right optical module is locked onto the right mounting shoe when fully slid thereon, and it is unlocked by a similar manual movement of a flexible leg 53R, to release the interlocking tab 51R and recess 49R.

The flexible leg 53L is located on the left optical module's upper left side, and the flexible leg 53R is located on the right optical module's upper right side. These locations facilitate installation and removal of the optical modules even when the frame is being worn.

In use, the user 15 slidably engages a first associated pair of left and right optical modules 13L and 13R onto the respective left and right mounting shoes 29L and 29R, whereupon a first optical effect is achieved. When the user desires a different optical effect, the first associated pair of optical modules is removed by sliding each from its associated mounting shoe, and a second pair of associated left and right optical modules, e.g., 13L' and 13R' is then selected and installed. In this manner, the user can select between different optical effects merely by sliding off a particular pair of associated optical modules and sliding on a different pair of associated optical modules.

Figure 5:
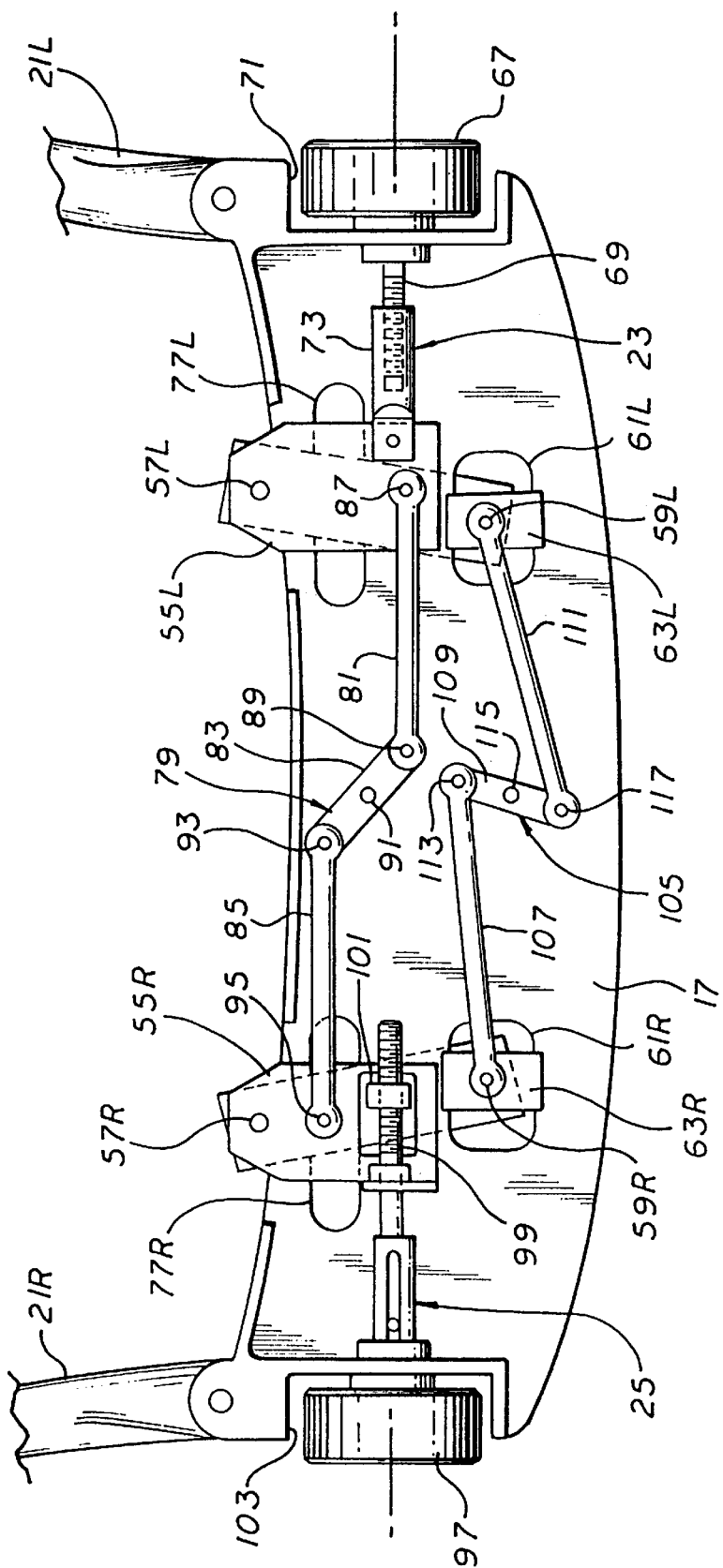
FIG. 5 is a top plan view of a portion of the portable viewing apparatus of FIG. 1A, showing the mechanism for controlling interocular distance and convergence of the left and right optical modules.

Now with reference to FIGS. 2, 3 and 5, it will be observed that the left and right mounting shoes 29L and 29R are pivotally secured at their rearward to respective left and right support plates 55L and 55R located above the top surface of the visor 17. Specifically, the left shoe is pivotally secured to the left support plate by a pivot pin 57L, and the right shoe is pivotally secured to the right support plate by a pivot pin 57R. Further, the forward ends of the shoes are supported by pins 59L and 59R that project upwardly through apertures 61L and 61R formed in the visor to engage bushings 63L and 63R, respectively. The bushing 63L includes a boss 65L that projects downwardly into the aperture 61L, and the bushing is slightly wider than the aperture so that its edges engage the visor and the visor thereby can support a portion of the weight of the underlying left shoe 29L and left optical module 13L. The bushing 63R is similarly configured, so that the weight of the right shoe 29R and right optical module 13R are similarly supported.

The interocular spacing control assembly 23 is situated on the visor 17, for use in manually adjusting the spacing between the left mounting shoe 29L and the right mounting shoe 29R, and thus the interocular spacing between the left optical module 13L and the right optical module 13R. The assembly 23 includes a control knob 67 and an associated screw 69, with the knob 67 being seated in a recess 71 located at the left temple portion of the visor. The screw threadedly engages a nut 73 that is secured to the left support plate 55L. Rotating the control knob and screw causes the nut to ride along the screw and to slide the support plate 55L laterally along the visor. This lateral movement is constrained by a boss 75L that extends downwardly from the support plate into a slot 77L formed in the visor. The lateral movement effects corresponding lateral movement of the left mounting shoe 29L, and thereby the attached left optical module 13L.

Lateral movement of the left support plate 55L is coupled by an interconnection mechanism 79 to the right support plate 55R, to effect complementary lateral movement of that plate, and thereby the underlying right mounting shoe 29R and attached right optical module 13R. This interconnection mechanism 79 includes a left tie rod 81, a pivot rod 83, and a right tie rod 85. The left tie rod 81 is pivotally secured at one end by a pin 87 to the left support plate 55L and at its other end by a pin 89 to one end of the pivot rod 83. The pivot rod is itself pivotally mounted to the visor 17 by a pin 91. The right tie rod is pivotally secured at one end by a pin 93 to the pivot rod and its other end by a pin 95 to the right support plate 55R.

Thus, an inward lateral movement of the left support plate 55L causes the left tie rod 81 to move rightward, causing a clockwise pivoting of the pivot rod 83. This clockwise pivoting, in turn, moves the right tie rod 85 leftward, causing the right support plate 55R to move leftward. Reduction of the interocular spacing between the left and right support plates, and in turn the left and right optical modules 13L and 13R, thereby is effected. Increasing the interocular spacing is accomplished in a corresponding, opposite manner.

Still referring to FIGS. 2 and 5, the convergence control assembly 25 is situated on the visor 17, to enable the user 15 to control the convergence/divergence of the mounting shoes 29L and 29R, and thereby the selected pair of optical modules, e.g., the modules 13L and 13R. This allows the apparatus to be adjusted according to the distance to the object, e.g., a television screen, being viewed.

The convergence control assembly 25 includes a convergence control knob 97 and an associated screw 99 that threadedly engages a captive nut 101 mounted to the right mounting shoe 29R. The control knob 97 is seated within a recess 103 located in the right temple portion of the visor. Rotating the knob and screw causes the captive nut to ride along the screw and to pivot the mounting shoe 29R about the pivot pin 57R. The captive nut 101 is, itself, pivotally secured by any suitable means to top side of the shoe, so that its threaded bore can remain substantially aligned with the screw 99.

Pivoting movement of the right mounting shoe 29R is coupled by a convergence interconnection mechanism 105 to the left mounting shoe 29L, to effect complementary pivoting movement of that shoe. This interconnection mechanism includes a right convergence tie rod 107, a pivot rod 109 and a left convergence tie rod 111. The right convergence tie rod is pivotally secured at one end by the pin 59R to the forward end of right mounting shoe 29R, and at the other end by a pin 113 to the pivot rod 109. The pivot rod is itself pivotably mounted to the visor 13 by a pin 115. The left convergence tie rod 111 is pivotally secured at one end by a pin 117 to the pivot arm 109, and at its other end by the pin 59L to the left mounting shoe 29L.

Thus, an inward pivoting movement of the right mounting shoe 29R moves the right tie rod 107 leftward, causing a clockwise pivoting of the pivot rod 109. This clockwise pivoting, in turn, moves the left tie rod 111 rightward, causing the left mounting shoe 29L to pivot rightward. Convergence of the two shoes thereby is effected. Divergence is accomplished in a corresponding, opposite manner. This adjustment of convergence and divergence has only a limited effect on the interocular spacing of the modules 13L and 13R, because the modules pivot about pins 57L and 57R that are located very close to the user's pupils.

The left and right optical modules of the plurality of associated pairs of optical modules each include two or more lenses, configured to provide a particular optical effect for the user. Typically, three lenses are placed in optical alignment within each optical module, and the lenses preferably are aspheric, to provide improved imaging. The lenses, as well as all other components of the apparatus, may be molded of a suitable plastic material. When the optical modules are properly mounted on the mounting shoes, they are located adjacent to the user's eyes without any intervening optical lenses.

Figure 4:
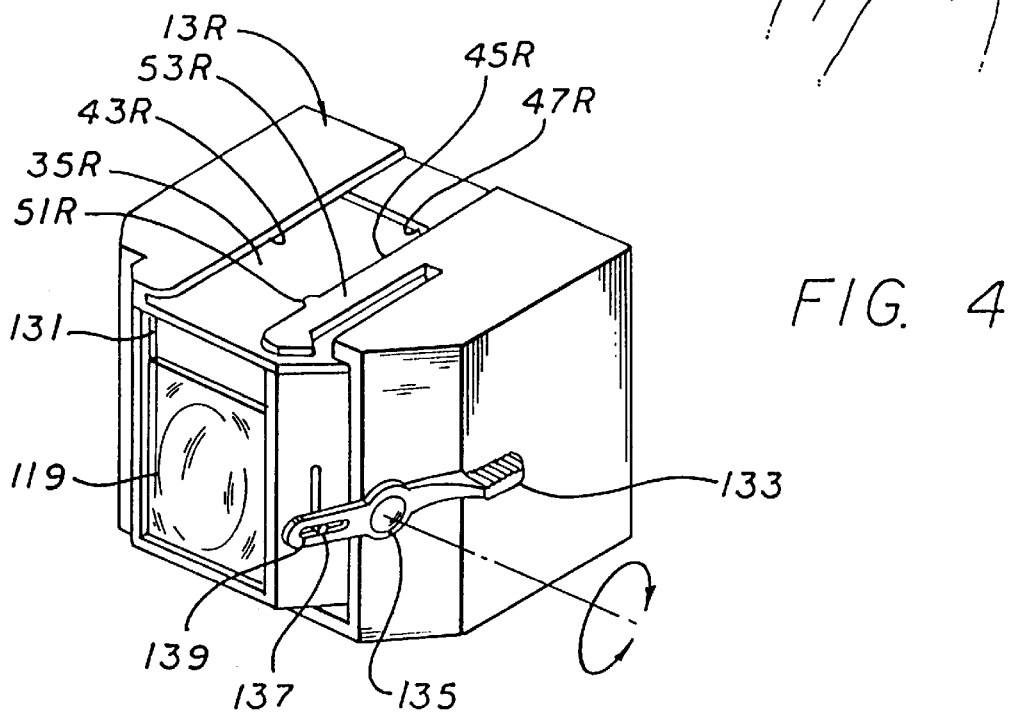
FIG. 4 is a rear perspective view of a right optical module, showing a first lever for adjusting the module's focal length and a second lever for adjusting the rear lens' vertical position.

As shown in FIGS. 2–4, the rear lens or eyepiece 119 of each optical module 13L or 13R has a generally circular peripheral shape, while the forward lens 121 of each module has a generally rectangular peripheral shape. This rectangular shape provides the user 15 with a desirable rectangular image. In addition, this rectangular image is maintained for all possible adjustments of the interocular spacing control assembly 23, because the assembly is constrained to move the left and right optical modules only along a linear axis and thus to maintain the modules in a horizontal orientation.

With specific reference to FIG. 3, focusing of an individual optical module 13L or 13R is achieved by configuring the forward lens 121 in each module to be slidably mounted so as to allow a manual adjustment of the spacing between that lens and the rear lens of the module. In the left optical module 13L, a focus adjustment lever 123L is pivotably mounted to the exterior of the optical module by a pin 125L, and a post 127L projects from the slidably mounted lens or lens mounting plate to extend through a slot 129L formed in the focus adjustment lever. Pivoting the lever 123L moves the post 127L and the lens 121L forward or rearward. This alters the distance between the slidably mounted lens 121L and the rear lens 119L, to adjust the lens assembly's focal length. Corresponding structure is included in the right optical module 13R, as shown in FIG. 4.

The focus adjustment structure descirbed immediately above is mounted on the left side of the left optical module 13L and on the right side of the right optical module 13R. This facilitates a convenient adjustment of each module's focal length while the viewing apparatus 11 is being worn.

In the right optical module 13R (see FIG. 4), the rear lens 119 is configured for vertical translation along runners 131. A vertical adjustment lever 133 is pivotably mounted to the right optical module by a pin 135, and a post 137 projects laterally from the rear lens through a slot 139 formed in the vertical adjustment lever, such that pivoting the lever moves the post and the rear lens upward and downward relative to the other lens(es) of the optical module. This adjusts the relative vertical positions of the images perceived by the user's left and right eyes. The vertical adjustment lever 133 is mounted on the right side of the right optical module 13R, to facilitate a convenient adjustment of the module's image while the veiwing apparatus 11 is being worn.

The vertical adjustment feature described immediately above is advantageously included only in optical modules configured to provide magnification along a vertical axis; it is not included in optical modules configured to include anamorphic lenses for horizontal magnification, only. In an alternative configuration (not shown in the drawings), the vertical adjustment of the rear lens is accomplished using a set screw located on the lens module's underside, which urges the lens upward, against the yielding bias of a spring.

It should be appreciated from the foregoing description that the present invention provides a portable viewing apparatus that allows the user to select between multiple pairs of associated optical modules, to provide the user with a desired focal range and magnification level appropriate for a wide range of viewing distances and screen magnification effects. The present invention further provides the user the ability to switch pairs of optical modules to achieve disanamorphic magnification, to view horizontally compressed images in normal proportion, without the need for a separate viewing device. Moreover, the present invention permits the user to switch pairs of optical modules to achieve a three-dimensional viewing effect from a two-dimensional video image without the need for a separate three-dimensional viewing apparatus. The present invention further provides the user with a single convergence control which simultaneously moves the left and right optical modules through complementary angular rotation, thus providing better viewing to the user, as well as ease and accuracy in making convergence adjustments. The present invention further provides the viewer with a focus adjustment to focus the lens elements of a single optical module, and vertical adjustment of a single lens element of a single optical module to correct for viewing aberrations. All of these adjustments can be conveniently made while the apparatus is being worn.

Although the invention has been described in detail with reference to the presently preferred embodiment, it should be understood by those with ordinary skill in the art that various modifications can be made without departing from the invention. Accordingly, the invention is defined only by the appended claims.

We claim:

1. A portable viewing apparatus comprising:

a frame configured to be worn on a user's head;

a left receiving device and a right receiving device secured to the frame such that they are located adjacent to the user's respective left and right eyes when the frame is being worn, each of the left and right receiving devices defining a longitudinal axis;

a left optical module configured to be removably received individually by the left receiving device, and a right optical module configured to be removably received individually by the right receiving device; and a convergence adjustment mechanism secured to the frame, for selectively adjusting the convergence of the longitudinal axes of the left and right receiving devices;

wherein the left receiving device and the left optical module, together, include a left rectangular shoe having substantial parallel side walls and further include a left slot having undercut, substantially parallel side edges sized to conformably and slidably receive the left rectangular shoe;

wherein the right receiving device and the right optical module, together, include a right rectangular shoe having substantially parallel side walls and further include a right slot having undercut, substantially parallel side edges sized to conformably and slidably receive the right rectangular shoe;

wherein the left receiving device and the left optical module, together, include a left locking mechanism for releasably securing the left optical module to the left receiving device;

wherein the right receiving device and the right optical module, together, include a right locking mechanism for releasably securing the right optical module to the right receiving device;

wherein the left and right locking mechanisms each include a tab and mating recess defined in the rectangular shoe and in one of the side edges of the corresponding slot, the tab and mating recess being configured to engage each other when the shoe is fully received in the slot;

and wherein each of the left and right optical modules includes two or more lenses that provide a specific optical effect for the user, and a focusing mechanism that controllably adjusts the axial spacing between the lenses of the module, to provide focusing at a selected range, including distances of less than about 25 feet.

2. A portable viewing apparatus as defined in claim 1, and further comprising means, secured to the frame, for controllably adjusting the interocular spacing between the left and right receiving devices.

3. A portable viewing apparatus as defined in claim 2, wherein the means for controllably adjusting the interocular spacing is configured to move the left and right receiving devices toward and away from each other along a substantially linear path.

4. A portable viewing apparatus as defined in claim 1, wherein the plurality of lenses in each of the left and right optical modules are configured to provide substantially uniform image magnification in two dimensions, over a predetermined range.

5. A portable viewing apparatus as defined in claim 1, wherein each of the left and right optical modules includes a lens having a peripheral shape that is substantially rectangular.

6. A portable viewing apparatus as defined in claim 1, wherein at least one of the left and right optical modules includes means for adjusting the vertical position of one of its two or more lenses relative to another of its two or more lenses.

7. A portable viewing apparatus as defined in claim 1, wherein the left and right optical modules are configured such that, when they are removably received by the respective left and right receiving devices, they are located adjacent to the user's respective left and right eyes, without any intervening optical lenses.

8. A portable viewing apparatus as defined in claim 1, wherein each of the left and right optical modules includes a housing formed of a plastic material.

9. A portable viewing apparatus as defined in claim 1, wherein the left and right locking mechanisms each further include:
an elongated, flexible leg that defines one of the side edges of the corresponding slot.

10. A portable viewing apparatus as defined in claim 9, wherein:
the left receiving device includes the left rectangular shoe, and the right receiving device includes the right rectangular shoe; and
the left optical module includes the left slot, and the right optical module includes the right slot.

11. A portable viewing apparatus as defined in claim 10, wherein:
the tab of the left locking mechanism is carried by the flexible leg, and the mating recess of the left locking mechanism is carried by the left shoe; and
the tab of the right locking mechanism is carried by the flexible leg, and the mating recess of the right locking mechanism is carried by the right shoe.

12. A portable viewing apparatus as defined in claim 9, wherein:
the flexible leg of the left locking mechanism and the focusing mechanism of the left optical module both are located on the left side of the left optical module, such that they are readily accessible when the left optical module is received by the left receiving device and the apparatus is being worn; and
the flexible leg of the right locking mechanism and the focusing mechanism of the right optical module both are located on the right side of the right optical module, such that they are readily accessible when the right optical module is received by the right receiving device and the frame is being worn.

13. A portable viewing apparatus as defined in claim 1, wherein the left and right optical modules further are configured, when they are removably received by the respective left and right receiving devices, to substantially fill the fields of view of the user's respective left and right eyes.

14. A portable viewing apparatus comprising:
a frame configured to be worn on a user's head;
a left receiving device and a right receiving device secured to the frame such that they are located adjacent to the user's respective left and right eyes when the frame is being worn, each of the left and right receiving devices defining a longitudinal axis;
a left optical module configured to be removably received individually by the left receiving device, and a right optical module configured to be removably received individually by the right receiving deice;
a mechanism secured to the frame for selectively and simultaneously moving the left and right receiving devices toward and away from each other, to adjust the interocular spacing therebetween; and
a mechanism secured to the frame for selectively and simultaneously adjusting the convergence of the longitudinal axes of the left and right receiving devices;
wherein the left receiving device and the left optical module, together, include
a left rectangular shoe having substantially parallel side walls,
a left slot having undercut, substantially parallel side edges sized to conformably and slidably receive the left rectangular shoe, and
a left locking mechanism for releasably securing the left optical module in place, with the left rectangular shoe conformably received in the left slot, the left locking mechanism including
an elongated, flexible leg that defines one of the side edges of the left slot, and
a tab and mating recess defined in the flexible leg and the left rectangular shoe and configured to engage each other when the left rectangular shoe is fully received in the left slot;
wherein the right receiving device and the right optical module, together, include
a right rectangular shoe having substantially parallel side walls,
a right slot having undercut, substantially parallel side edges sized to conformably and slidably receive the right rectangular shoe, and
a right locking mechanism for releasably securing the right optical module in place, the right locking mechanism including
an elongated flexible leg that defines one of the side edges of the right slot, and
a tab and mating recess defined in the flexible leg and the right rectangular shoe and configured to engage each other when the right rectangular shoe is fully received in the right slot;
wherein the flexible leg of the left locking mechanism and the focusing mechanism of the left optical module both are located on the left side of the left optical module, such that they are readily accessible when the left optical module is received by the left receiving device and the frame is being worn;
and wherein the flexible leg of the right locking mechanism and the focusing mechanism of the right optical module both are located on the right side of the right optical module such that they are readily accessible when the right optical module is received by the right receiving device and the frame is being worn.

15. A portable viewing apparatus as defined in claim 14, wherein the plurality of lenses in each of the left and right optical modules are configured to provide substantially uniform image magnification in two dimensions, over a predetermined range including distances of less than about 25 feet.

16. A portable viewing apparatus as defined in claim 14, wherein each of the left and right optical modules includes a lens having a peripheral shape that is substantially rectangular.

17. A portable viewing apparatus as defined in claim 14, wherein at least one of the left and right optical modules includes means for adjusting the vertical position of one of its two or more lenses relative to another of its two or more lenses.

18. A portable viewing apparatus as defined in claim 14, wherein the left and right optical modules are configured such that, when they are removably received by the respective left and right receiving devices, they are located adjacent to the user's respective left and right eyes, without any intervening optical lenses.

19. A portable viewing apparatus as defined in claim 14, wherein each of the left and right optical modules includes a housing formed of a plastic material.

20. A portable viewing apparatus as defined in claim 14, wherein:
- the left receiving device includes the left rectangular shoe, and the right receiving device includes the right rectangular shoe; and
- the left optical module includes the left slot, and the right optical module includes the right slot.

21. A portable viewing apparatus as defined in claim 14, wherein:
- the tab of the left locking mechanism is carried by the flexible leg, and the mating recess of the left locking mechanism is carried by the left shoe; and
- the tab of the right locking mechanism is carried by the flexible leg, and the mating recess of the right locking mechanism is carried by the right shoe.

22. A portable viewing apparatus as defined in claim 14, wherein the left and right optical modules further are configured, when they are removably received by the respective left and right receiving devices, to substantially fill the fields of view of the user's respective left and right eyes.

* * * * *